(12) United States Patent
Yonker et al.

(10) Patent No.: US 7,067,142 B2
(45) Date of Patent: Jun. 27, 2006

(54) PACKAGED RODENTICIDE

(75) Inventors: James W. Yonker, Racine, WI (US);
Nathan R. Westphal, Racine, WI (US);
Michael J. Skalitzky, Kenosha, WI
(US); Brian T. Davis, Burlington, WI
(US); Dingwen Li, Shanghai (CN)

(73) Assignee: S.C. Johnson & Son, Inc., Racine, WI (US)

( * ) Notice: Subject to any disclaimer, the term of this patent is extended or adjusted under 35 U.S.C. 154(b) by 180 days.

(21) Appl. No.: 10/054,145

(22) Filed: Jan. 22, 2002

(65) Prior Publication Data
US 2003/0138472 A1 Jul. 24, 2003

(51) Int. Cl.
*A01N 25/32* (2006.01)
*A01N 43/16* (2006.01)

(52) U.S. Cl. .................. 424/406; 424/84; 424/407; 424/409; 424/410; 424/411; 424/412; 424/413; 424/414; 514/457; 514/920; 43/131

(58) Field of Classification Search ............... 424/406, 424/407, 409, 410, 414, 84; 574/920; 119/650, 119/651; 43/124, 131; 514/451, 453, 456, 514/457
See application file for complete search history.

(56) References Cited

U.S. PATENT DOCUMENTS

| 416,951 | A | * | 12/1889 | Roop |
| 1,479,704 | A | | 1/1924 | Duddleson |
| 2,813,058 | A | | 11/1957 | Smith |
| 2,957,804 | A | * | 10/1960 | Shuyler ............... 424/10.3 |
| 4,514,960 | A | | 5/1985 | Sears |
| 4,809,455 | A | * | 3/1989 | Smart ................. 43/4.5 |
| 4,891,218 | A | | 1/1990 | Sherman |
| 5,044,113 | A | | 9/1991 | Stack et al. |
| 5,449,514 | A | | 9/1995 | Marshall et al. |
| 5,469,968 | A | | 11/1995 | Matthews et al. |
| 5,720,951 | A | | 2/1998 | Baker |
| 5,747,063 | A | | 5/1998 | Languet et al. |
| 5,806,237 | A | * | 9/1998 | Nelson et al. .......... 43/131 |
| 6,216,925 | B1 | | 4/2001 | Garon ................. 222/645 |

OTHER PUBLICATIONS

MacFarlan Smith Limited; "Bitrex An Aversion Agent for Product Safety"; Sep. 1988.

* cited by examiner

*Primary Examiner*—Neil S. Levy

(57) ABSTRACT

A packaged animal poison includes a binder/rodenticide/bait mix molded into a cellulosic housing. The housing is covered with a removable cover. The housing defines an internal cavity in which the rodenticide is disposed, a lower wall extending laterally beyond the cavity, and an outer lower surface with adhesive at its underside. The package itself may also contain rodent attractant material and/or a human aversion agent.

11 Claims, 2 Drawing Sheets

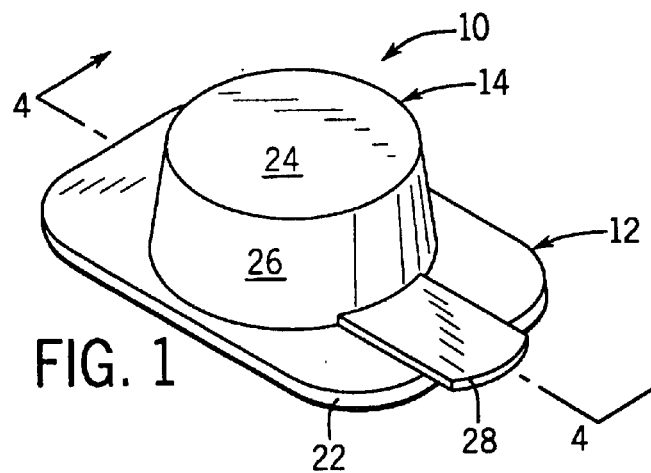
FIG. 1
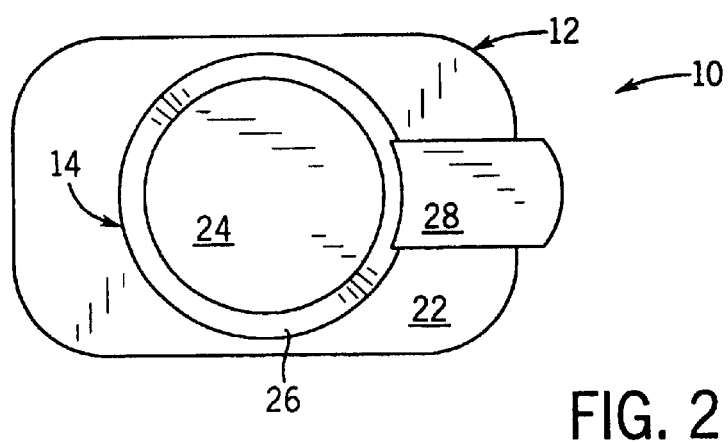
FIG. 2
FIG. 3
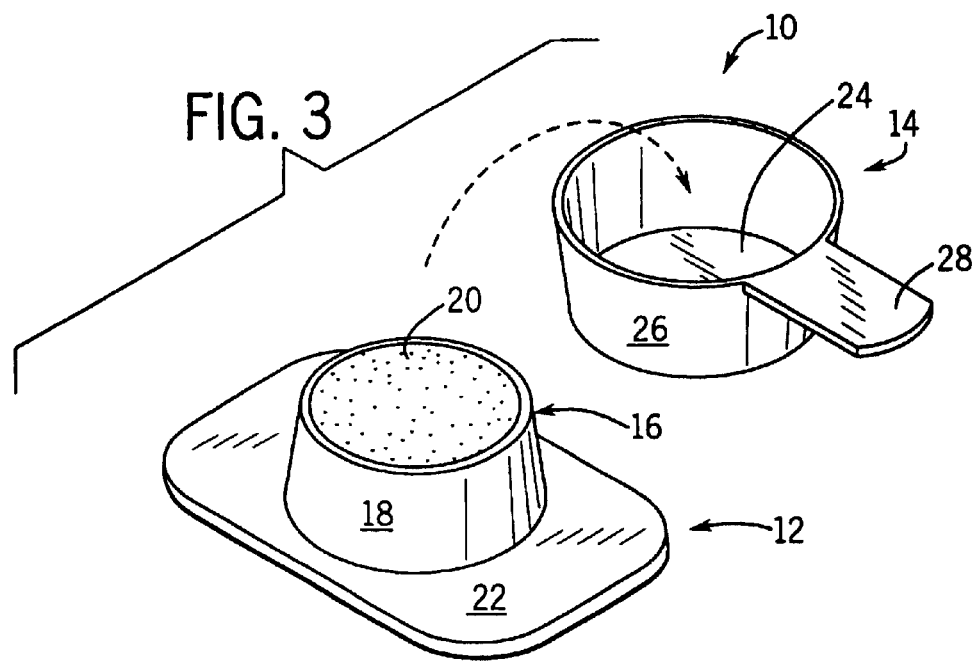

PACKAGED RODENTICIDE

CROSS-REFERENCE TO RELATED APPLICATIONS

Not applicable

STATEMENT OF FEDERALLY SPONSORED RESEARCH/DEVELOPMENT

Not applicable

BACKGROUND OF THE INVENTION

The present invention relates to packaged animal poisons, particularly packaged poison/bait mixes which can be fixed in place. It appears to be especially well suited for providing a packaged rodenticide/bait to control rodents.

There are a variety of existing poison baits which attract murine (e.g. rodents such as mice and rats) or other animals (e.g. crawling insects such as cockroaches, ants, crickets and earwigs) for the purpose of killing them. For example, relatively large solid rodenticide blocks have been developed in which the poison and bait are combined with a paraffin wax. These blocks are positioned for use without any surrounding packaging. See e.g. U.S. Pat. Nos. 4,891,218 and 5,044,113.

Such baits often contain much more poison and bait than are needed to attract and kill a single rodent. Because of the time delay between feeding and death, the animal may eat much more of the bait than is needed to kill it. This wastes material.

Further, a consumer or a business will not typically want to disclose to visitors or customers that they have a rodent infestation. The larger the bait/rodenticide, the harder it will be to hide it.

Another type of known bait is a package of small poison bait pellets. For example, "place packs" are rodent chewable packages, made for example of polyglysine-lined paper, containing such pellets. Such place packs are initially left unopened when placed in a desired location. The bait attracts rodents, notwithstanding the closed package. Rodents will be baited to gnaw through the package to reach the rodenticidal bait.

"Sachet" packages are boxes or packets of such pellets. These are opened by the consumer before leaving the pellets for the rodents. They commonly use cardboard or plastic sheeting for their packaging material, but the material is not important as the rodents do not need to chew through the packaging to access the bait.

Once the first rodent has gnawed through the package, or the package has been opened by the consumer, pellets may be spilled out of the package (e.g. due to contact by rodents or a human). Aside from the fact that this is visually messy, there is a potential hazard regarding leaving small pieces of poisonous material strewn around a floor. Moreover, cleaning up the scattered pellets can expose consumers or others to the poison if the bait isn't carefully handled.

U.S. Pat. No. 4,514,960 teaches using microwave energy to mold a wax-based insecticide/insect bait block within a dispensing package. This helps reduce the spilling potential of the insecticide. However, no structure is depicted for using this technology.

U.S. Pat. No. 5,720,951 teaches that rodenticidal baits can have included therein a food substance of interest to the rodent (e.g. wheat or sugar), a poison (e.g. brodifacoum, which is a coumarin anticoagulant, warfarin, or bromadiolone), a binder such as wax, and a human aversion agent, such as denatonium benzoate, which is a bittering agent sold under the trade name Bitrex®. A low concentration of Bitrex® will not interfere with rodent feeding, but will be so bitter as to cause a small child who might try to eat the bait to spit it out immediately.

Nevertheless, there still is a need for developing improved packaged animal poisons, particularly with respect to the placement of small, confined "servings" of bait at desired feeding locations, and with respect to providing means for assuring consumers regarding the amount of bait remaining.

BRIEF SUMMARY OF THE INVENTION

In one aspect the invention provides a packaged animal poison. We use the term "animal" in its broadest sense as covering any live animal susceptible to being poisoned, including especially without limitation rats, mice and insects.

In a first form, there is a package having a housing, a cover, and an internal cavity there between. An animal poison/bait mix is positioned in the internal cavity and affixed to the package. By "affixed" we mean any technique for linking the poison bait mix to the housing such as bonding it to the housing and/or trapping a formed block in the housing by appropriate tapering or interlocking. The cover is removably mounted to the housing so that it can in one position conceal the animal poison bait mix, and in a second position permit examination of the internal cavity.

In preferred forms the housing is in the form of a base having a flat bottom surface and a wall extending upwardly there from. The flat bottom surface extends laterally beyond the wall to form a handle. Also, the base can have an adhesive applied on a downwardly facing surface thereof (suitable to anchor the package to a particular position in a room). The cover can have a downwardly open cup configuration, with a tab extending radially outward there from to form a handle.

The invention is particularly useful where the poison is a rodenticide such as brodifacoum, bromadiolone or warfarin, and at least a portion of the package is made from a cellulosic material, a bittering agent and a rodent attractant. In this form, the package material itself acts as part of the bait.

The packaging material can have other desirable features as well. For example, it may have mixed in an antibiotic to control mold formation, and/or be colored with a red dye or other warning color to indicate the presence of a poison.

A particularly desirable way of adhering the poison to the internal walls of the cavity is to mix it and a suitable bait material into heated binder (such as wax), then pour, scoop, or pack the flowable poison/wax/bait mixture into the cavity, and then allow the wax to cool. This molds the bait in the cavity, while simultaneously adhering it to the packaging.

In another aspect the invention provides a method for poisoning a murine animal (e.g. mouse, rat). One positions a packaged poison/bait on an essentially horizontal surface. The packaged poison/bait has (i) a package having a base, a cover, and an internal cavity there between; and (ii) a poison/bait mix positioned in the internal cavity and affixed to the package. The cover is removably mounted to the base so that it can in one position conceal the poison, and in a second position permit examination of the internal cavity. One then permits a murine animal to chew into the package and then chew the poison positioned therein.

It will be appreciated from the above disclosure and the following description that the flat base of the package, and the adhesive on the lower surface thereof, permit the package to be anchored on a variety of surfaces so that it will not easily move. In a preferred form the cavity is tapered so that the bait, once formed, cannot fall out of the cavity if the packaged is opened upside down before an animal accesses it (regardless of whether the wax binds to the packaging).

A consumer can examine the bait to confirm that the manufacturer included a bait/poison in the package, and at any time thereafter to confirm that an adequate amount of bait remains. Both the base and the cover are provided with handle areas to help a consumer avoid contact with the poison when handling the package or removing the cover.

Moreover, the package can be so small that it is relatively inconspicuous. For example, it can be sized so as to include only a sufficient amount of bait to kill a single rodent (and thus extra bait is not wasted).

The foregoing and other advantages of the invention will appear from the following description. In the description reference is made to the accompanying drawings which form a part thereof, and in which there is shown by way of illustration, and not limitation, preferred embodiments of the invention. Such embodiments do not necessarily represent the full scope of the invention, and reference must therefore be made to the claims herein for interpreting the scope of the invention.

BRIEF DESCRIPTION OF THE DRAWINGS

FIG. 1 is a top perspective view of a packaged animal poison according to the present invention;

FIG. 2 is a top view thereof;

FIG. 3 is a perspective view similar to FIG. 1, but with the cover removed;

DETAILED DESCRIPTION OF THE PREFERRED EMBODIMENT

Figure 4:
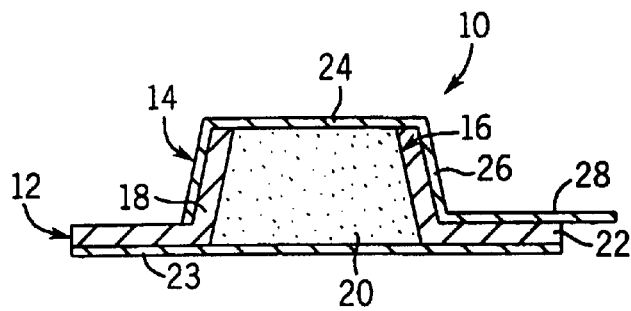
FIG. 4 is a cross-sectional view taken along line 4—4 of FIG. 1.
Figure 5:
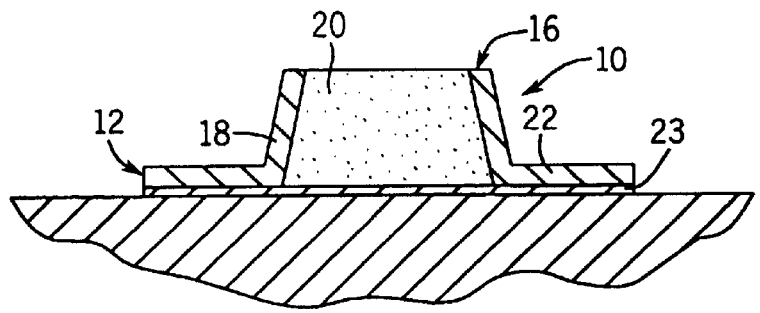
FIG. 5 is a view similar to FIG. 4, albeit with the cover removed.

Turning first to FIGS. 1–4, there is shown a rodenticidal package, generally 10, in accordance with the present invention. The package 10 includes a base/housing 12 and a removable cover 14. The base 12 has a central cavity 16, preferably tapering towards the opening at the top. As shown, the cavity may have a frusto-conical wall 18 which the rodenticide/bait/binder mix 20 adheres to.

A planar bottom 22 extends laterally outward from the cavity 16, preferably in both lateral directions. The elongated bottom 22 provides areas for a user to handle the device 10 without touching adjacent the rodenticide material 20. The bottom 22 may be multi-layer at certain portions such as shown by a paper backing 23 at its underside.

The cover 14 has an inverted cup-shape with a top 24 and a frusto-conical wall 26 defining an inverted recess sized to receive and fit snugly onto the base portion 18. A tab-like handle 28 preferably extends radially outward from the bottom of the wall 26 to lie against the bottom 22 of the base 12 when mounted thereon. The handle 28 extends beyond the edge of the base bottom 22 so that it can be grasped easily to lift the cover 14 from the base 12 without the user making dermal contact with the base. The weight of the base helps fix the position of the package once positioned in place.

Figure 6:
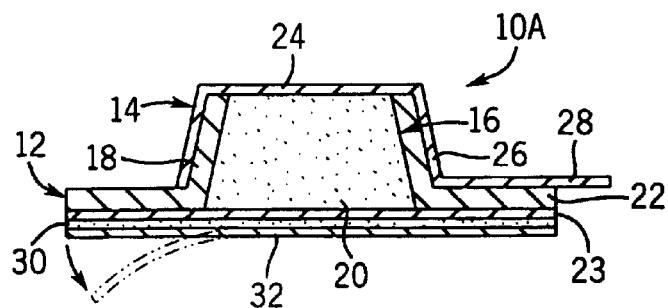
FIG. 6 is a view similar to FIG. 4, albeit showing a second optional embodiment having a peel off release liner protecting an adhesive layer.
Figure 7:
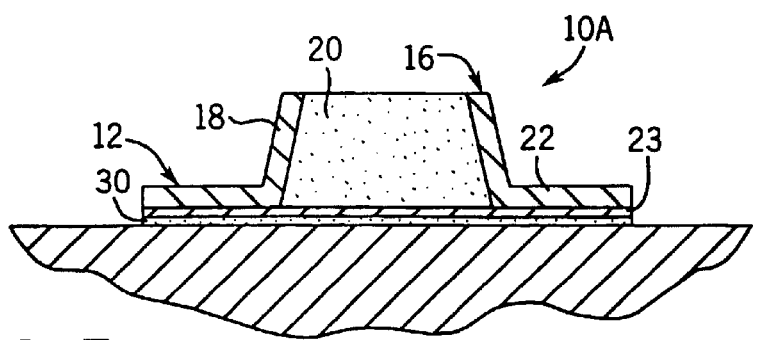
FIG. 7 is a view similar to FIG. 6, albeit with the cover and the release liner removed.

FIGS. 6–7 show an alternate embodiment for more securely fixing the position of the package. The elements of this embodiment are identical to that described above, albeit there is also an adhesive layer 30 adhered to the underside of the layer 23 which is in turn covered during storage and shipment (prior to use) by a release liner 32. As shown in FIG. 6, liner 32 is removed prior to using the device.

The adhesive 30 can be any suitable adhesive or double-sided adhesive tape. One example is that the adhesive can be an ordinary white water-activated starch paste. Alternatively, the adhesive can be of the type suitable for use with a peel-off release liner. Such liners are well known in other contexts, and are often made from heat sealable or pressure sensitive tape.

We prefer a rodenticide/bait material 20 that is between 0.001 and 0.005% brodifacoum (Syngenta of Basel, Switzerland), 0.001% benzyldiethyl [2,6-xylylcarbamoyl) methyl] ammonium benzoate (Bitrex®—Macfarlan Smith Limited of Edinburgh, Scotland), 20–50% of a wax binder (e.g. paraffin wax), and the remainder a mix of edible grains and carbohydrates. See generally U.S. Pat. No. 5,720,951 for various bait/poison mixes.

One preferably mixes a wax-based rodenticide at a temperature slightly above the melting point of the wax, and then pours the mixture into the cavity of the housing while the mixture is still in a flowable state. As the liquid cools, the wax hardens (much as a candle would). The wax preferably bonds to some extent to the cellulosic packaging. For large rodents, we prefer using about 3–10 g of this rodenticide/bait/wax material per package.

The base 12 and cover 14 can be made of a molded pulp material. However, other cellulosic materials should be suitable, particularly cardboard or paper. Other packaging materials are also possible (e.g. thin plastics). In any event, the packaging should be made of a material that a rodent will readily chew through in order to access the bait/poison.

In one form the packaging can have neutral palatability (for a rodent), with the odor of the bait in the cavity motivating the rodent to try to eat through the packaging. However, it could alternatively be coated or formed with or of a rodent feeding stimulant such as ground peanut shells, ground insect pupae, grain, meat, cheese, oil, or fruit. In any event, in use, the cover 14 need not be removed since the rodent can gnaw through it to get to the bait.

As an additional precaution, the packaging (and/or the poison) could also include a human aversion agent, such as Bitrex®, or malodors, such as rancid oil, fermented fruit, or spoiled meat. This will further discourage consumption by children.

The device 10 is used by removing it from its outer display/shipment packaging (not shown), removing the release layer 32 (where applicable) and (for example) placing it on a horizontal or other surface where rodents are likely to be present. The device can be grasped by the lateral ends of the base bottom 22 for ease of handling. The cover 14 can be left mounted on the base 12 during installation (or at all times if desired). Alternatively, as shown in FIG. 3, a consumer can be assured of the presence of the poison by temporarily removing the cover. This can be done immediately after installation, or at any later time where the consumer wishes assurance that the product is still suitable to be used.

The cover 14 can be removed by lifting it by the handle 28 (much as an upside down pot could be). The device 10 can thus be used without requiring the user to manually contact the rodenticide or other poison. While the extra weight of the ends of the base alone help anchor the device (e.g. brief gusts of wind are unlikely to significantly move it), it is more preferred to use the second embodiment where a release liner 32 can be peeled away so as to permit the adhesive layer 30 to be adhered to the floor, cabinet wall or other supporting surface. Alternatively, the package can be glued in place.

The invention thus provides a multi-part package for a position controlled animal poison (especially rodenticide). One aspect of the position control is the trapping of the remaining bait inside the device even when the package is partially disturbed/gnawed by the rodent. The tapered side walls help keep the molded wax bait in position, as does the binding of the formula to the cellulosic packaging. Thus, even after a rodent nibbles on the bait, the remaining bait is not likely to spill out of the package.

Another aspect of the position control is that the overall package can be anchored in place. Thus, a human accidentally bumping against it, or a rodent sampling the bait, will not move it from the desired position.

It will be appreciated that the present invention permits more controlled dispensing of poisonous bait. The position of the baiting can be carefully controlled, and only those animals that access those positions and gnaw the anchored bait will be poisoned.

Further, waste of poisonous bait is reduced as the packages can be optimized to "single serving" sizes, and bait will no be spilled out of the baiting station.

Moreover, the present invention provides greater control by the consumer over the use of the product. The consumer can activate the product by adhering it at a desired position, check the status of the product over time, and remove the product when the bait has been sufficiently eaten.

The packaging is suitable for anchoring by a wide variety of adhesive techniques, thereby making it useful for placement on a wide variety of surfaces. For example, the adhesive can be sufficiently sticky to prevent wind gusts from moving the package, but otherwise permit the package to be peeled off the supporting surface quite easily.

Where particular animals are to be attracted, but not others, the mixture of malodors and taste aversion agents with animal feeding attractants can be selected accordingly. This provides great flexibility in designing baits.

The above describes preferred embodiments of the present invention. However, many modifications may be made to these embodiments without departing from the spirit and scope of the invention. For example, the disclosed devices are shown as frustum-shaped. However, they need not be upwardly tapered, nor be peripherally round. Other shapes should work with the present invention. Thus, the following claims should be looked to in order to judge the full scope of the invention.

Industrial Applicability

The present invention provides a packaged animal poison/bait.

We claim:

1. A packaged animal poison, comprising:
    a package formed in part of murine animal attractant, the package having a housing, a cover mountable on the housing, and an internal cavity defined by the housing and the cover;
    an animal poison bait mix positioned in the internal cavity and affixed to the package; and
    wherein the cover is removably mounted to the housing so that it can in one position covering the housing conceal the animal poison bait mix, and in a second position different from the first position permit examination of the internal cavity;
    wherein at least a portion of the package is made from a material which a murine animal can chew through.

2. A packaged animal poison of claim 1, wherein the housing has an upright wall and a flat bottom wall that extends laterally beyond the upwardly extending wall to form a handle, wherein an underside of the bottom wall has an adhesive.

3. A packaged animal poison of claim 1, wherein the animal is a murine animal.

4. A packaged animal poison of claim 2, wherein the cover has a downwardly open cup configuration, with a tab extending radially outward there from to form a handle.

5. A packaged animal poison of claim 1 wherein the poison is a rodenticide.

6. A packaged animal poison of claim 5, wherein the rodenticide is an anticoagulant selected from the group consisting of brodifacoum, bromadiolone, and warfarin.

7. A packaged animal poison of claim 1, wherein at least a portion of the package is made from a cellulosic material.

8. A packaged animal poison of claim 1, wherein at least a portion of the package is made with a human aversion agent selected from the group consisting of a bitter agent and a malodorous agent.

9. A packaged animal poison of claim 1, wherein the animal poison is mixed in wax inside the cavity, and the wax is adhered to the package.

10. A packaged animal poison of claim 9, wherein the animal poison is molded into the cavity.

11. A method for poisoning a murine animal, comprising:
    positioning on an essentially horizontal surface a packaged poison bait by having an adhesive on a lower surface of the packaged poison bait removably attach the packaged poison bait to the surface, wherein the packaged poison bait comprises:
        (i) a package formed in part of murine animal attractant, the package having a base, a cover, and an internal cavity defined by the base and the cover; and
        (ii) a mix of poison and bait positioned in the internal cavity and affixed to the package, wherein the cover is removably mounted to the base so that it can in one position conceal the poison, and in a second position permit examination of the internal cavity, wherein at least a portion of the package is made from a material which a murine animal can chew through; and
    permitting a murine animal to eat into the package and then chew the poison positioned therein.

* * * * *